United States Patent [19]

John et al.

[11] 4,102,256
[45] Jul. 25, 1978

[54] COOKING APPARATUS

[75] Inventors: Raymond John, Carpentersville; Jerome G. Apfelbaum, Arlington Heights; Robert L. Moore, LaGrange, all of Ill.

[73] Assignees: Engineering Inventions Inc., LaGrange; Multisensors Inc., Chicago, both of Ill.

[21] Appl. No.: 687,099

[22] Filed: May 17, 1976

Related U.S. Application Data

[63] Continuation of Ser. No. 292,479, Sep. 27, 1972, abandoned.

[51] Int. Cl.$^2$ .............................................. A47J 37/06
[52] U.S. Cl. ........................................ 99/372; 99/393; 219/525
[58] Field of Search ................. 99/372, 349, 351, 375, 99/379, 385, 391, 393, 340, 376, 377, 378, 389; 126/194; 219/524, 525, 387; 248/24

[56] References Cited

U.S. PATENT DOCUMENTS

| | | | |
|---|---|---|---|
| 1,859,004 | 5/1932 | Reich | 99/379 |
| 1,874,836 | 8/1932 | Trenner et al. | 99/375 |
| 2,027,002 | 1/1936 | Spang | 99/351 UX |
| 2,033,060 | 3/1936 | Anderson | 99/379 |
| 2,300,323 | 10/1942 | Tams | 99/340 X |
| 2,644,880 | 7/1953 | Valentini et al. | 219/525 |
| 2,779,850 | 1/1957 | Gomersall | 99/385 UX |
| 3,313,230 | 4/1967 | Simjian | 99/375 |
| 3,678,248 | 7/1972 | Tricault et al. | 219/525 |
| 3,725,645 | 4/1973 | Shevlin | 219/387 X |
| 3,736,981 | 6/1973 | Shevlin | 219/387 X |
| 3,746,837 | 7/1973 | Frey et al. | 219/387 |

Primary Examiner—Harvey C. Hornsby
Assistant Examiner—Arthur O. Henderson
Attorney, Agent, or Firm—McDougall, Hersh & Scott

[57] ABSTRACT

A cooking apparatus for cooking food held in a container which includes upper and lower housing portions. Heating elements are located in the respective housing portions, and the opposed inner walls of the housing portions are adapted to be moved into contact with the food container. The heating elements are positioned immediately adjacent these walls, and these elements are substantially insulated from other portions of the housing. The intimate contact between the inner walls and the associated heating elements causes the food to act as a heat sink whereby the food is rapidly heated in a highly effective manner. The apparatus is particularly useful for the cooking of frozen food located in an appropriate container.

16 Claims, 23 Drawing Figures

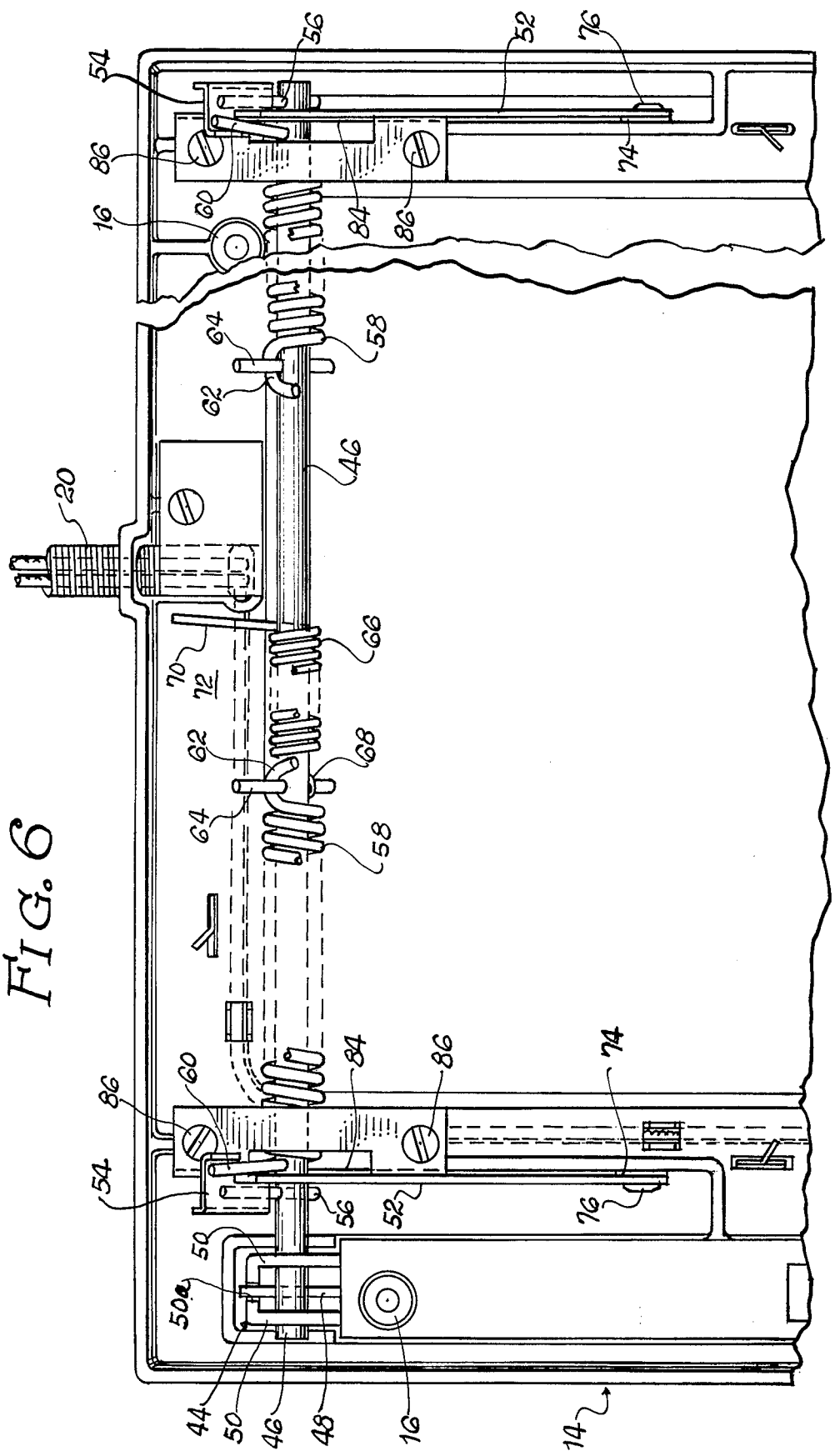

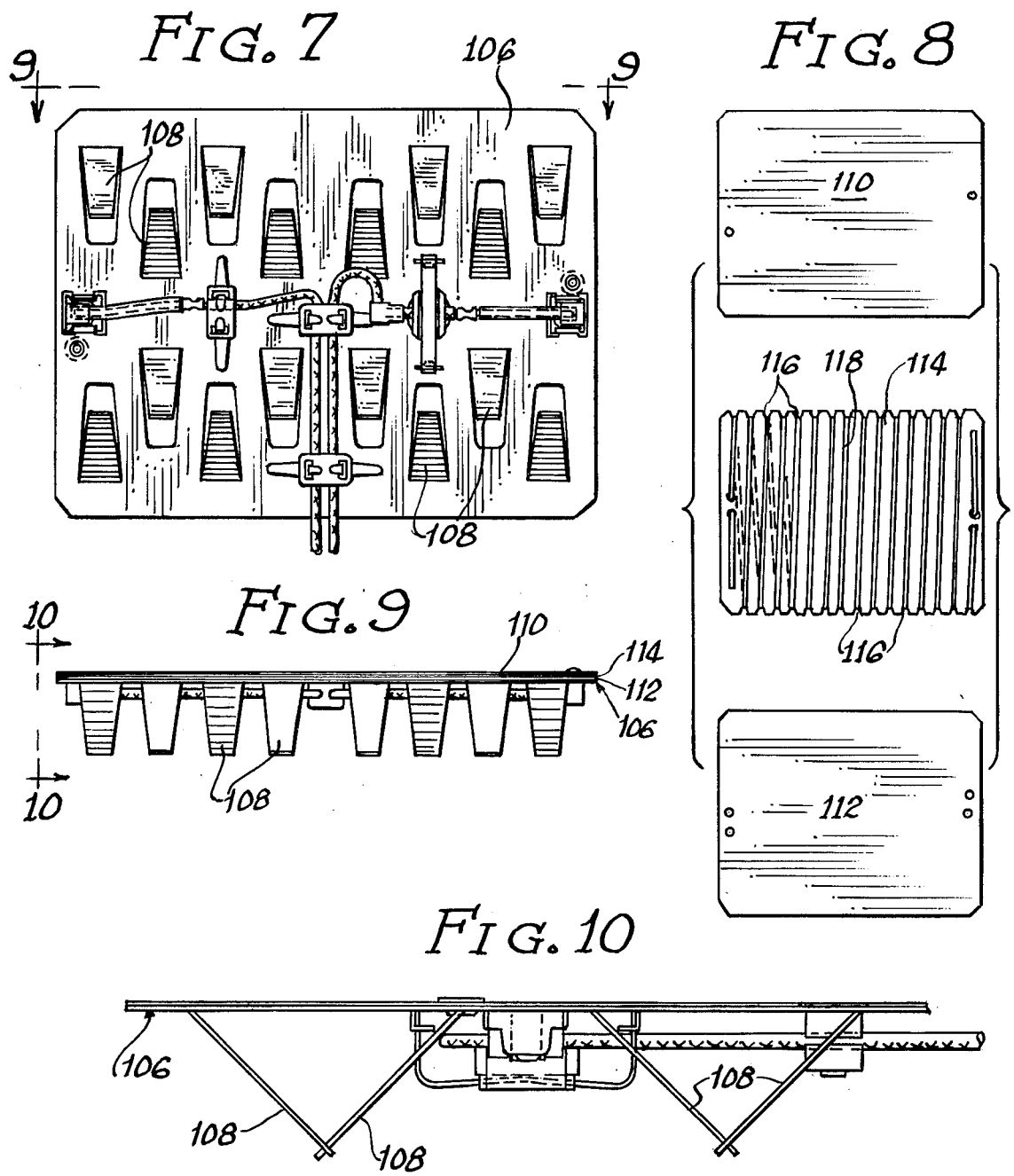

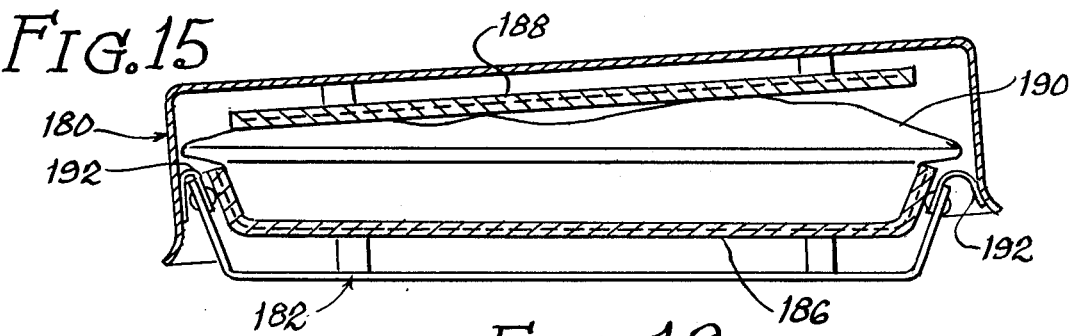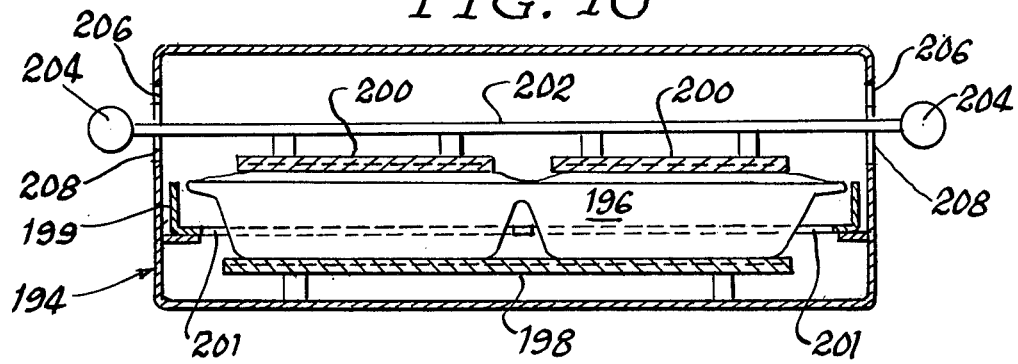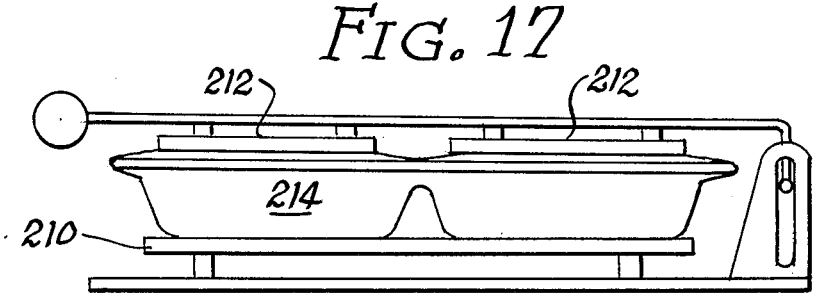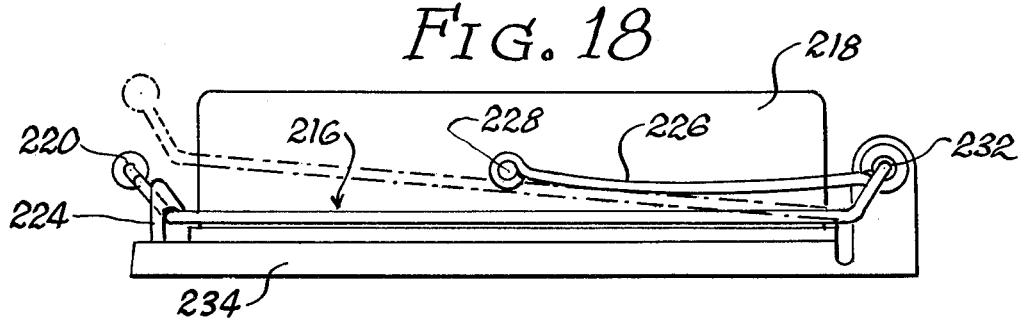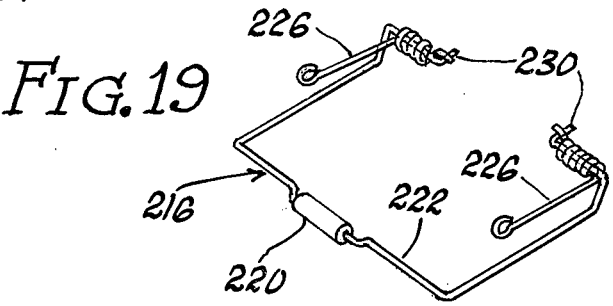

COOKING APPARATUS

This is a continuation, of application Ser. No. 292,479, filed Sept. 27, 1972 now abandoned.

This invention relates to a cooking apparatus for use in conjunction with food which is held in a container. Frozen "TV" dinners are typical examples of products adapted to be cooked with the apparatus of the invention. The invention will be described with respect to the cooking of food of this type; however, it will be understood that other containerized food products are suitable for use in conjunction with the apparatus of this invention including food which is handwrapped for use in the apparatus.

Frozen dinners are becoming increasingly popular due to the obvious convenient features thereof. It is recognized, however, that the dinners are often somewhat less than appetizing, and they suffer from the additional disadvantage of requiring substantial time for cooking. A typical dinner package recommends a heating time of 35 minutes which detracts from the convenience aspects thereof.

It is a general object of this invention to provide an improved apparatus for cooking food such as frozen dinners.

It is a more specific object of this invention to provide a cooking apparatus which is capable of cooking frozen dinners and the like very rapidly while providing maximum appetizing characteristics for the food product.

It is a still further object of this invention to provide a cooking apparatus which includes improved structural characteristics whereby the operation of the apparatus can be carried out in a highly efficient manner.

It is a still further object of this invention to provide a cooking apparatus which includes highly efficient heating mechanisms whereby rapid cooking of food products can be accomplished with a minimum of energy dissipation.

These and other objects of this invention will appear hereinafter and for purposes of illustration, but not of limitation, specific embodiments of the invention are shown in the accompanying drawings in which:

FIG. 6 is a fragmentary bottom plan view of the construction;

FIG. 7 is a detailed view of a heating element support means utilized in the construction;

FIG. 8 illustrates in plan view the layers utilized in the heating element of the construction;

FIG. 9 is a side elevation taken about the line 9—9 of FIG. 7 illustrating the heating element assembly and the associated support;

FIG. 10 is an enlarged side elevation of the heating element assembly taken about the line 10—10 of FIG. 9;

Figure 20:
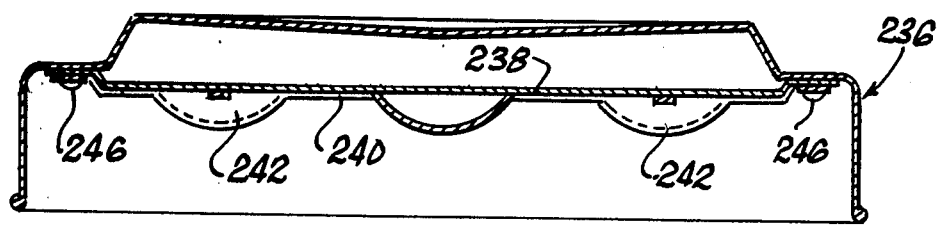
Figure 21:
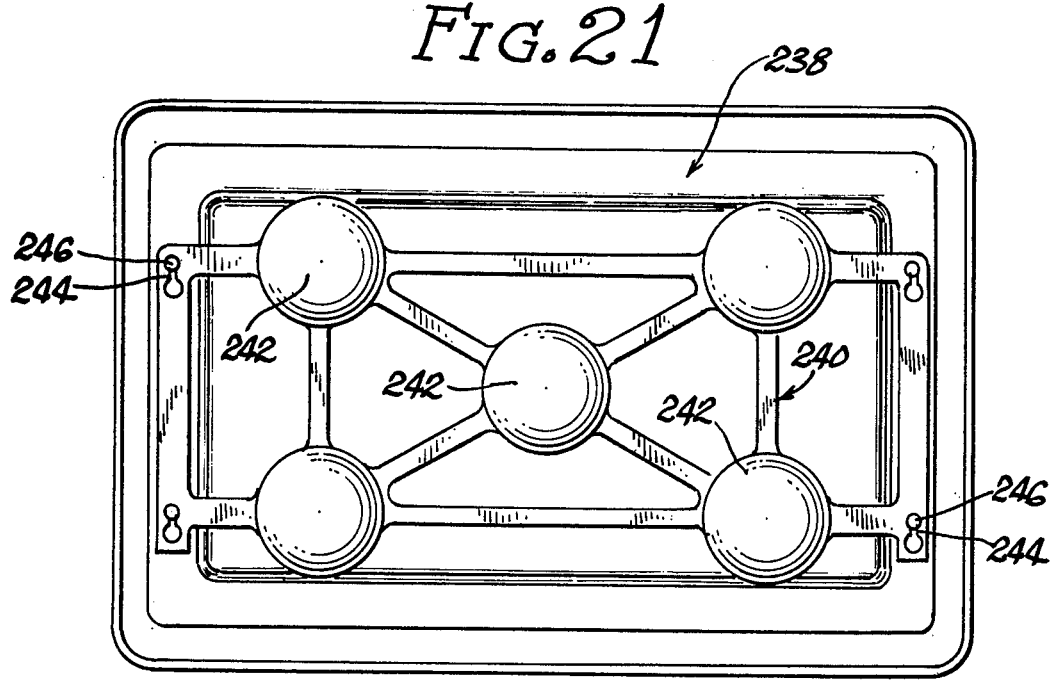
Figure 22:
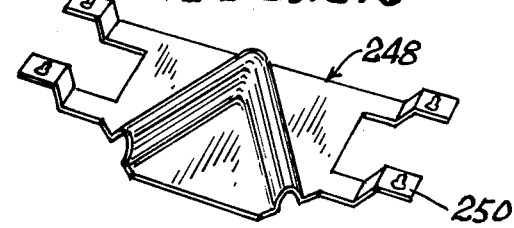
Figure 23:
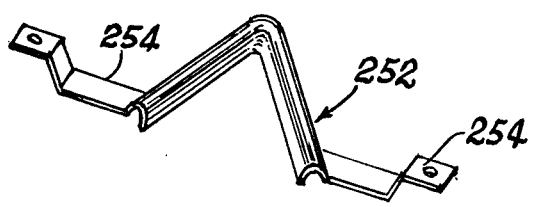

FIGS. 11 through 16 comprise cross-sectional views of respective alternative forms of the invention;

FIG. 17 is an elevational view of an additional alternative form of the invention;

FIG. 18 is an elevational view of a still further alternative form of the invention;

FIG. 19 is a perspective view of a spring loaded hinge mechanism incorporated in the structure shown in FIG. 18;

FIG. 20 is a cross-sectional view of an upper housing for a cooking apparatus including a modified heat transmitting arrangement;

FIG. 21 is a bottom plan view of the upper housing shown in FIG. 20;

FIG. 22 is a perspective view illustrating a removable heat conductor adapted to be associated with an upper housing; and, FIG. 23 is a perspective view of a removable heat conductor adapted to be associated with a lower housing.

This invention generally relates to a cooking apparatus utilized for cooking food held in a container construction. The apparatus includes a support for the container, and heating means are associated with the support. The heating means are held adjacent inner walls of the support whereby the heating means are closely associated with the food container.

Insulating means are provided for substantially preventing heat transfer from the heating element to the adjacent support portions. This results in functioning of the food container as a heat sink whereby substantially all of the heat transferred from the heating elements is utilized for cooking the food product. The inner walls of the supporting apparatus are designed for intimate contact with the food container whereby highly efficient heat transfer results.

The structure of the invention is preferably characterized by a linkage for upper and lower housings which cooperates with the heating elements to provide the efficient operation described. Specifically, the linkage permits the use of food containers of different heights with the upper and lower housing being separated, depending upon the size of the food container. The linkage also preferably includes spring mechanisms which facilitate opening of the housings while at the same time operating to provide spring pressure for holding the housings in intimate contact with the food container during operation of the cooking apparatus.

Figure 1:
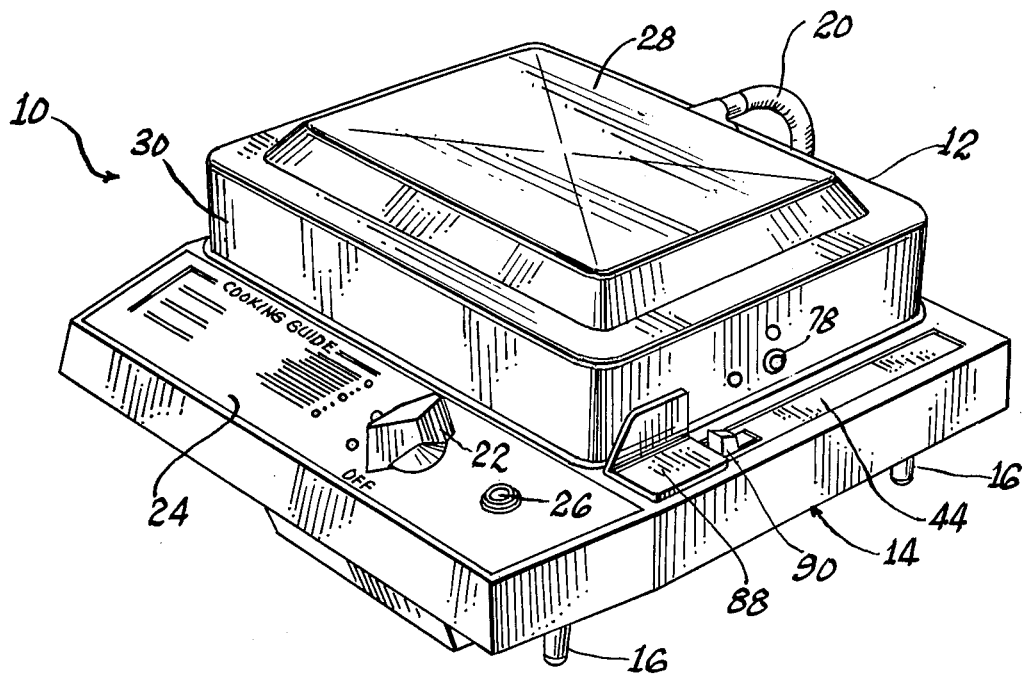
FIG. 1 is a perspective view of a cooking apparatus characterized by the features of this invention.
Figure 2:
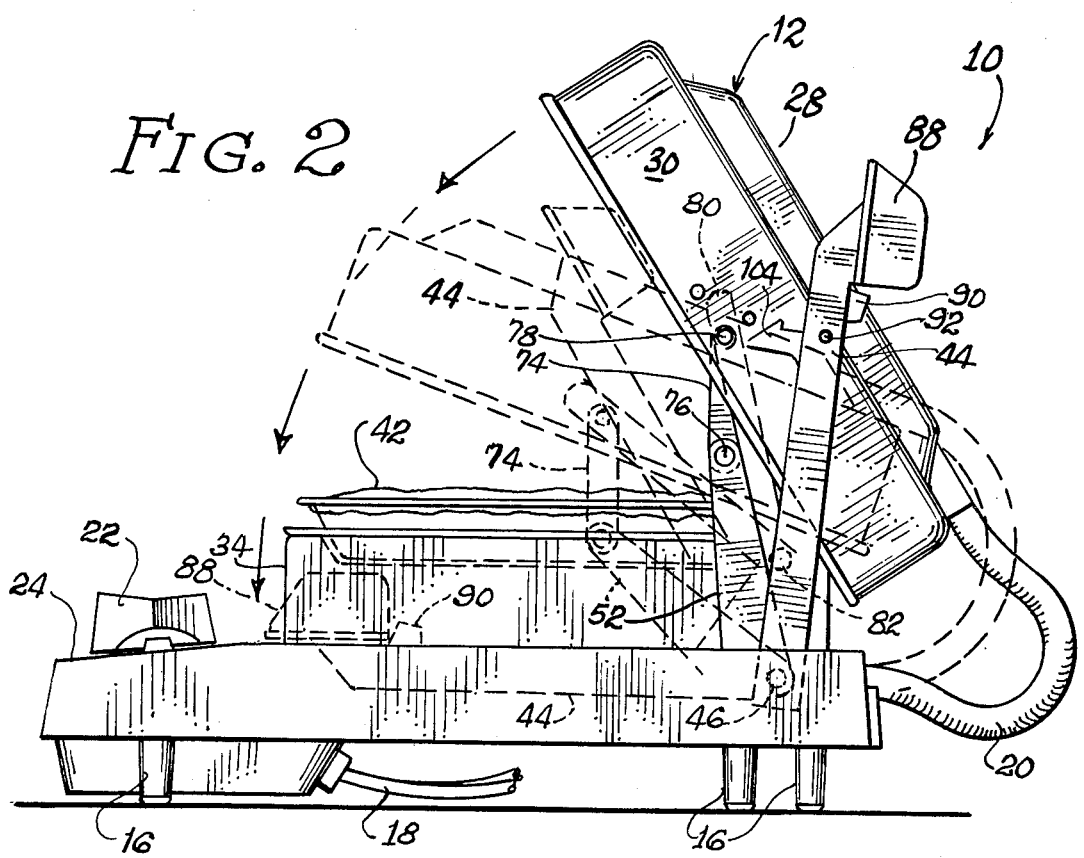
FIG. 2 is a side elevation of the apparatus with the upper housing portion in the open position.

FIGS. 1 and 2 illustrate a cooking apparatus 10 characterized by the features of this invention. The apparatus comprises an upper housing 12 and a lower housing 14, the latter being provided with legs 16 whereby the structure is suitable for countertop use. A cord 18 is provided for connecting the apparatus to a suitable source of electricity. Flexible conduit 20 extends between the upper and lower housings so that electrical operation of heating elements in both these housings can be accomplished.

A timer switch 22 is positioned on a wall portion 24. This switch may be movable between various settings, and as shown in FIG. 1, a cooking guide can be displayed adjacent this switch. A light 26 is provided as a visual indication of the operating status of the apparatus.

Figure 3:
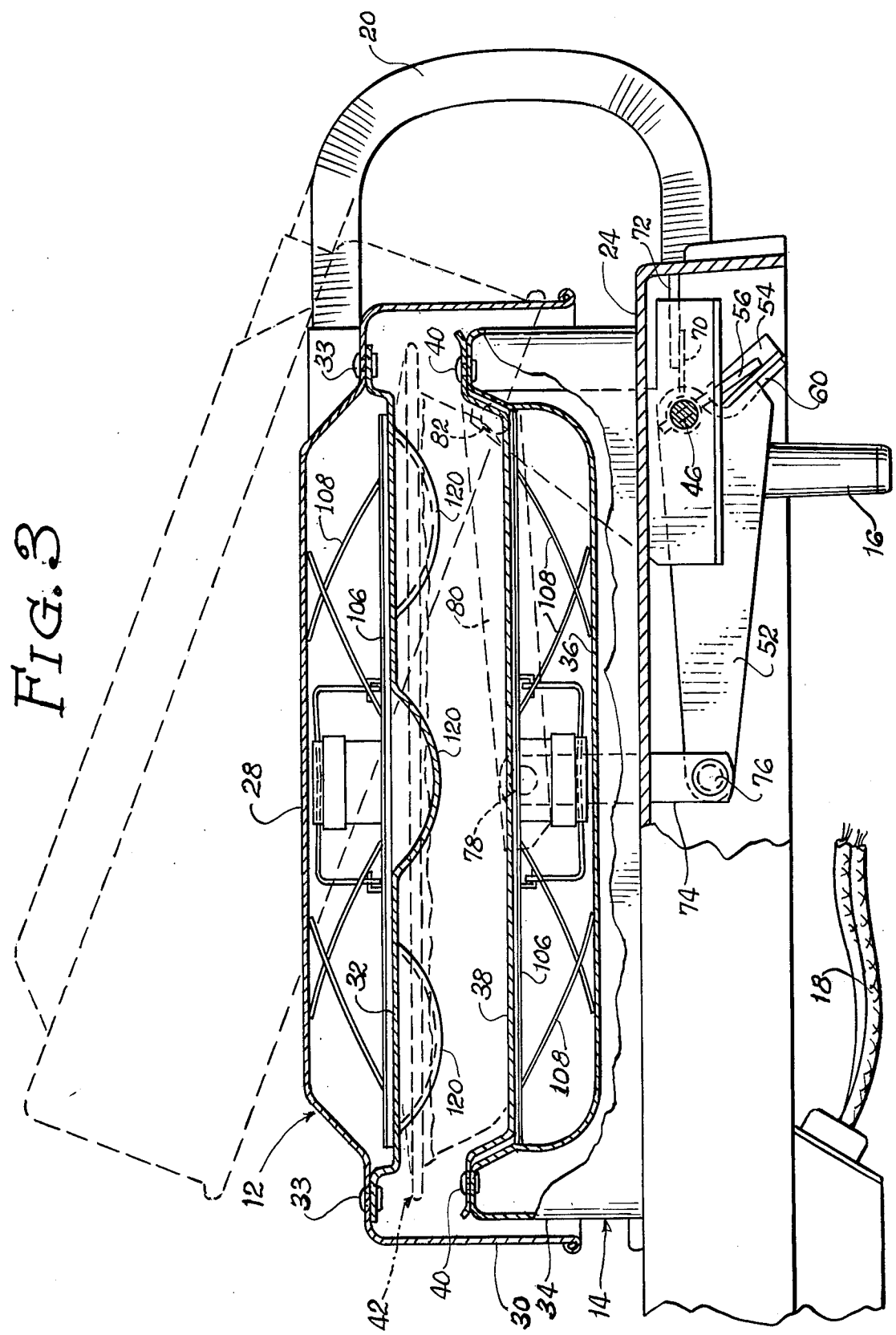
FIG. 3 is an enlarged fragmentary side elevation of the apparatus, partly cut away.

As best illustrated in FIG. 3, the upper housing 12 defines a top wall 28 and downwardly extending side walls 30. An inner wall 32 is connected by means of rivets 33 and this inner wall defines a receiving compartment in conjunction with the side walls 30.

The lower housing 14 defines side wall 34, and an intermediate wall 36 comprises a continuation of this side wall. Inner wall 38 is secured in the lower housing by means of rivets 40. The wall 38 defines an interior depressed area which forms a receiving compartment for the lower housing.

A food container 42 is adapted to be positioned between the housings 12 and 14 for receipt within the compartments formed by these housings. The container will typically comprise an aluminum foil pan and a foil cover extending over the contents of the pan.

FIGS. 2 through 6 illustrate the linkage provided for the upper and lower housing. This linkage includes an arm 44 which is attached to rod 46. The connection of the arm to the rod is provided by means of a pin 48 which extends through an opening in the rod. The arm 44 comprises a hollow member including side walls 50 and a slot 50a is defined at the end of the arm for receiving one end of the pin 48. The other end of the pin extends within the arm and is received by slot 49 of transverse wall 51 whereby the pin is held against movement relative to the arm so that movement of the arm and rod 46 will occur simultaneously.

Lever arms 52 are also mounted on the rod 46, and the lever arms are provided with integrally formed feet 54. Pins 56 extend through the rods 46, and these pins engage the feet 54 whereby a driving connection between the pin and foot is achieved. The lever arms 52 are provided at both ends of the rod 46 whereby pins 56 provide a driving connection at each location.

The rod 46 carries a pair of springs 58 with one arm 60 of each spring engaging a foot 54 on the side opposite the side engaged by pins 56. The opposite ends 62 of the springs 58 extend around pins 64 which are driven through the rod 46. This arrangement normally urges the lever arm 52 in a counterclockwise direction relative to the axis of rod 46.

A lighter spring 66 is also carried by the rod 46, and one end 68 of this spring extends around one pin 64. The other end 70 of the spring is positioned for engagement with shelf 72 which extends beneath the wall 24 of the lower housing. Due to the pressure of the end 70 against the shelf 72, the spring 66 operates to urge the rod 46 in a clockwise direction.

The end of each lever arm 52 carries a link 74 pivotally connected at 76. The opposite end of each link is pivotally connected at 78 to a second lever arm 80. The arms 80 are in turn pivotally connected at 82 to a pair of upstanding side plates 84. The plates 84 are secured to the underside of the lower housing by means of screws 86 as best shown in FIG. 6. Accordingly, the pivot points 82 are stationary during use of the apparatus.

Figures 4, 5:
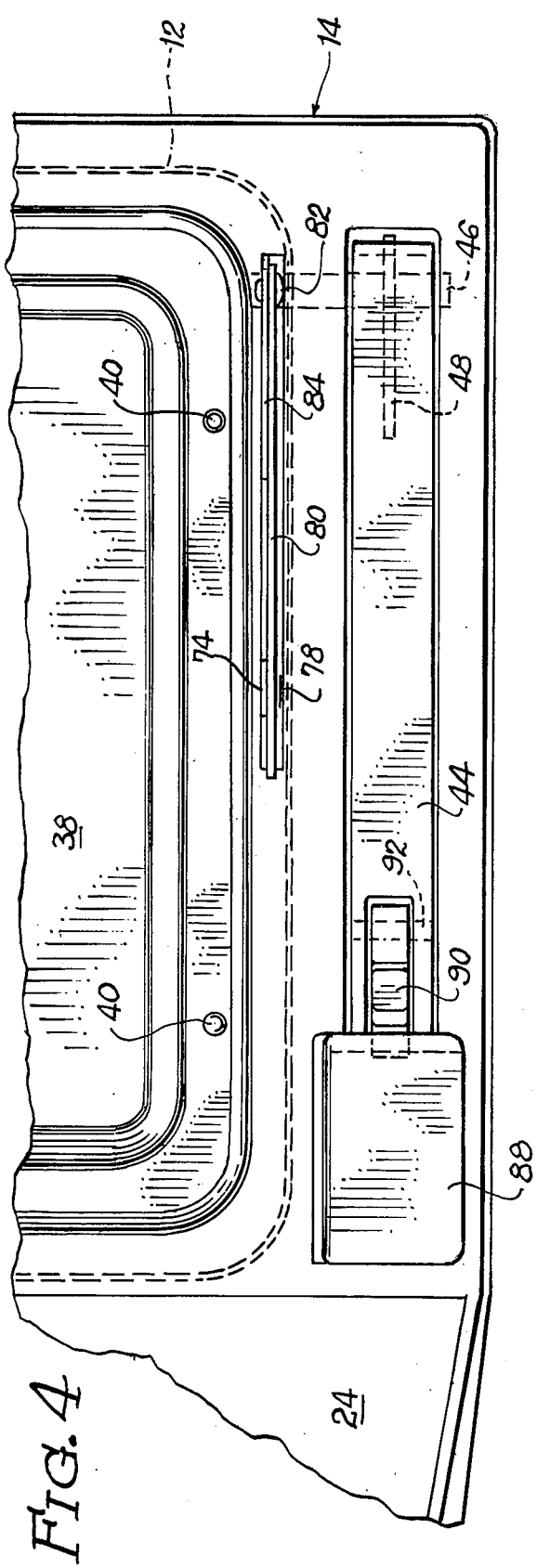
FIG. 4 is an enlarged fragmentary view illustrating the operating handle associated with the construction.
FIG. 5 is a fragmentary side elevational view, partly cut away, illustrating further details of the handle construction and associated linkage.

The arm 44 is provided with a handle 88 which is accessible at the side of the upper housing 12. A button 90 is pivotally connected to the arm on pin 92, and an extension 94 of this button defines a protuberance 96. A spring 98 fits around this protuberance, and this spring is seated within a recess 100 defined by the arm. The spring 98 normally urges the button in a clockwise direction as shown in FIG. 5.

A transversely extending rib 102 is provided in the lower housing and the rib defines a slot 103 for receiving the shoulder defined by the lower end 104 of the button 90. Considering the position shown in FIG. 5, the button 90 can be manually moved in the counterclockwise direction to release the button from engagement with the rib 102. During movement of the upper housing into a closed position, the sloping surface of the end 104 will result in automatic snapping of the button into the latched position.

FIGS. 7 through 10 illustrate heating element assemblies utilized for achieving the novel results of the invention. The assemblies include a support plate structure 106 which carries the wire and other electrical components necessary for providing current to the resistance heating elements utilized. The plate defines a plurality of cut-out sections 108 which are bent downwardly. The support is formed of a resilient material, such as a suitable stainless steel sheet whereby the portions 108 serve as spring legs.

FIG. 8 illustrates insulating sheets made of mica or comparable material. These sheets include outer sheets 110 and 112 and an intermediate sheet 114. The intermediate sheet is provided with notches 116 whereby resistance wire 118 can be wrapped around the sheet in a suitable spaced-apart condition.

The sheets are assembled as a sandwich with the sheet 114 carrying the resistance wire being the intermediate sheet. As shown in FIG. 9, this assembly is mounted on the top surface of the sheet 106.

In the assembly of the apparatus of the invention, a sheet 106 with associated heating elements is positioned in each of the housings 12 and 14. As illustrated in FIG. 3, the housing 12 defines a hollow interior between the walls 28 and 32, and the heating element assembly is positioned in contact with the wall 32. The legs 108 of the support 106 press against the wall 28 whereby contact of the heating element assembly with the wall 32 is maintained. The spring legs 108 maintain this contact even when there is a tendency for the heating element assembly to warp whereby the efficiency of the heating operation is maintained even after the apparatus has been used for an extended period.

A support 106 carrying the heating elements is mounted within the lower housing 14 in the same fashion as described with respect to the upper housing. In this instance, the legs 108 press against the wall 36 whereby the heating element assembly is forced into contact with the wall 38.

In the use of the construction described, the unit is first opened by manual engagement of the button 90. When this latching engagement is removed, the arm 44 can be pivoted upwardly from the position shown in FIG. 5. It will be noted that the position of button 90 is convenient to the handle 88 to simplify this operation.

The handle 88 is utilized for lifting the upper housing as illustrated in FIG. 2. This lifting movement occurs without any significant resistance other than the weight of the structure, and, therefore, access to the interior of the apparatus is easily obtained. The container 42 can thus be seated in position within the well defined by the wall 38 of the lower housing 12. When in the fully raised position, the spring 66 serves as a counterweight to hold the upper housing against dropping, for example, if the apparatus is accidentally bumped.

The handle 88 is then utilized for moving the upper housing downwardly to the position shown in FIG. 3. Due to the presence of the container 42, the upper housing is held in spaced relationship relative to the lower housing, and at this point, the side walls 30 of the upper housing function to close off the space between the housing. The provision of these downwardly extending side walls thus serves to minimize heat loss during a cooking operation.

The wall 32 of the upper housing preferably defines bulbous areas 120 which are located in selected positions on the wall. These bulbous areas protrude downwardly so that engagement of the wall 32 is initially provided solely by these areas. When the container 42 comprises a frozen food, the heating of the container will soften the contents to the extent that the area will gradually penetrate beyond the original upper level of the container. After this penetration, the area of contact between the wall 32 and the food product gradually increases, and this has been found to materially improve the efficiency of the cooking operation.

The weight of the upper housing 12 will, of course, assist in achieving the penetration of the areas 120. It is desirable, however, from the standpoint of material cost and operating ease to minimize the weight of the structural elements employed. Accordingly, the apparatus includes springs 58 which operate during cooking to press the upper housing downwardly toward the lower housing. Thus, it will be noted that the ends 60 of these springs press against the respective feet 54 to urge the lever arm 52 in a counterclockwise direction as viewed in FIG. 3.

A spring load is developed in the springs 58 due to the fact that the shaft 46 is rotated relative to the lever arm 52 during lowering of the arm 44 into latched position. Thus, when locating the upper housing on the lower housing while a container is holding these housings in spaced-apart relationship, the arm 44 must move counterclockwise relative to the arm 52 which provides the desired spring load. It will be noted that the springs 58 do not provide any resistance during lifting of the upper housing as shown in FIG. 2 since the lever arm 52 and rod 46 are then free to pivot in unison.

The combination of elements described provides a highly efficient heating operation. By the use of very thin insulating sheets 110, 112 and 114, for example in the order of .015 thickness, substantially all of the heat generated in the resistance elements is available for use. The manner of mounting the heating elements operated to preserve substantially all of the heat for cooking purposes since the heating elements substantially are insulated from contact with surrounding supports which would tend to carry heat away from the cooking area. The support 106 is primarily in contact with air, and the thin legs 108 will not conduct away large amounts of heat. The legs 108, of course, serve the additional function of pressing the heating element assembly into contact with the walls 32 and 38 so that the heat is passed directly to these walls.

The structure described results in functioning of the food in container 42 as a heat sink which, of course, provides the desired fast or short cooking period. Thus, the apparatus of the invention directs the heat toward the product to be cooked while substantially eliminating loss of heat to areas where it would be detrimental. The apparatus does not create any problem with respect to heating the area in which it is used which is a well-known problem with conventional ovens. More importantly, the efficiency of the heating operation results in substantially decreased cooking times whereby the convenience of frozen dinners is significantly increased. Cooking times in the order of 4 minutes for frozen dinners having a recommended cooking time of 35 minutes are typical.

The design of the wall 38 with the protruding bulbs 120 coupled with the linkage mechanisms of the invention is of major importance. It has been found that the penetration of these areas into the food product substantially increased the cooking efficiency and the spring pressure which is available during this phase of the operation greatly contributes to this efficiency.

FIGS. 11 through 19 illustrate alternative structures which incorporate various features of the invention, and which serve to illustrate various alternatives which can be considered for use in conjunction with the mechanisms already described.

Figure 11:
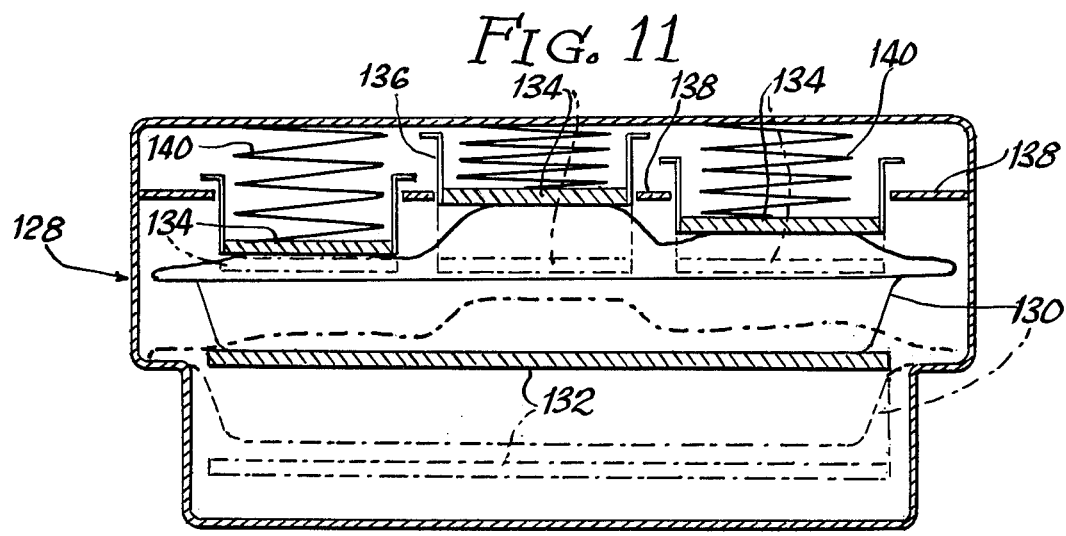

FIG. 11 illustrates a construction comprising a single housing 128 having a front door (not shown) for insertion of a food container 130. A movable support plate 132 serves to locate the container in the solid-line position shown whereby the container is engageable with spring loaded heating elements 134. These heating elements are independently secured within the housing whereby food containers having different height levels can be independently accommodated. As illustrated, the heating elements 134 are provided with brackets 136 engageable with transversely extending ledges 138 whereby the heating elements are normally retained in the dotted-line positions shown until forced upwardly in opposition to the compression springs 140.

Figure 12:
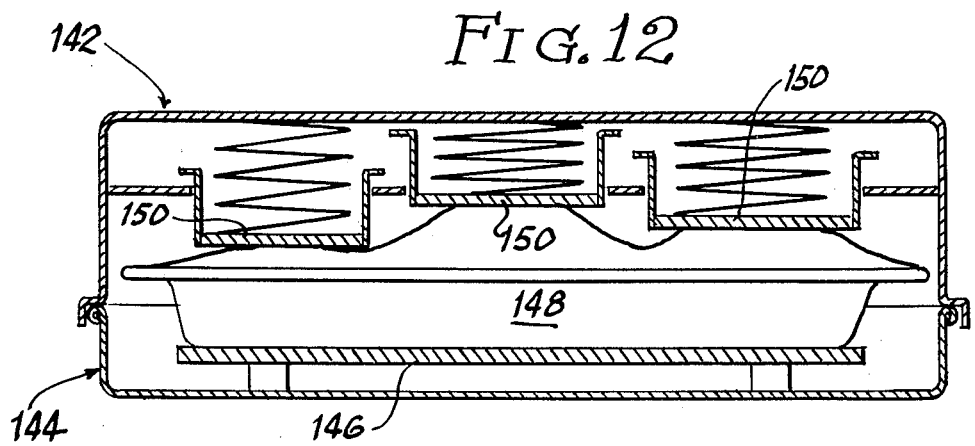

FIG. 12 illustrates a structure including an upper housing 142 and a lower housing 144. In this instance, a stationary supporting table 146 for food container 148 is provided. The respective housings are hinged together, and heating elements 150 of the type described with reference to FIG. 11 are provided for accommodating different areas of the container. It will be appreciated that the tables 132 and 146 may also be provided with heating elements so that heat can be supplied from both top and bottom.

Figure 13:
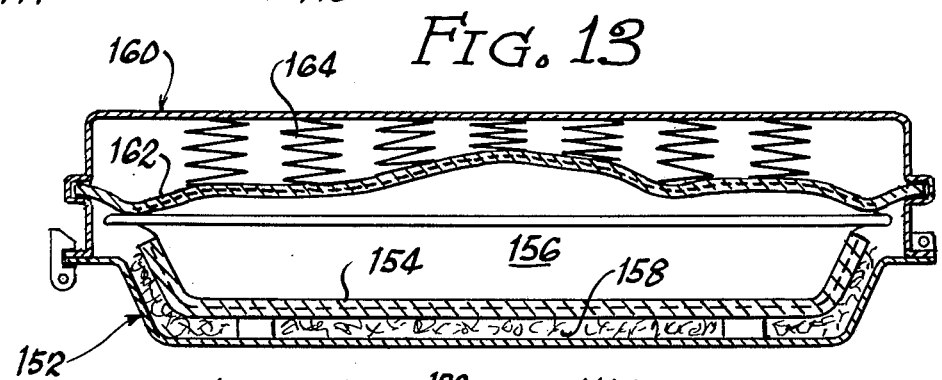

In the construction of FIG. 13, the lower housing 152 supports a dish structure 154 supplied with suitable heating elements and dimensioned to receive food container 156. Insulation 158 such as glass wool fills the area between the heating elements and the housing wall, and it will be appreciated that such insulation could be incorporated with the other structures described.

The upper housing 160 of the structure of FIG. 13 carries a flexible blanket 162 having heating elements disposed therein. A plurality of springs 164 contact this blanket, and this provides an arrangement whereby food containers having irregular contours can be efficiently heated.

Figure 14:
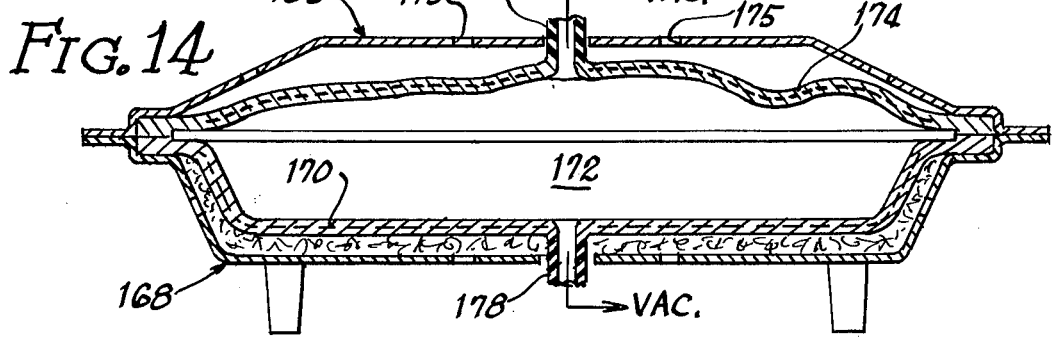

The structure of FIG. 14 comprises an upper housing 166 and a lower housing 168. The heating element 170 provided for the lower housing may be a stiff or flexible blanket for receiving container 172. A similar blanket 174 is carried by the upper housing. In this instance, however, conduits 176 and 178 communicate with the interior of the construction, and these conduits are connected to a vacuum source. When air is pumped out of the area supporting the container, the blankets will be in intimate contact with the container thereby providing heating efficiency. Essentially the same result can be achieved with this structure by applying gas or liquid pressure through ports 175. In either case, the arrangement of FIG. 14 provides side wall engagement which is also contemplated for other embodiments, for example, by providing spring loaded side walls.

FIG. 15 illustrates an additional embodiment wherein the upper housing 180 is attached to lower housing 182 by means of an arm or hinge arrangement such as previously described. The lower heating elements are incorporated at 186, and the upper heating elements 188 are brought into contact with the food container 190 preferably by spring means which act upon moving the housings relative to each other thereby. Flexible seals 192 are provided around the periphery of the construction to provide a suitable seal. In this arrangement, the mounting for the heating elements 188 is preferably flexible in nature to accommodate thickness variations in the food product.

FIG. 16 illustrates a housing 194 having a front door (not shown) through which food container 196 can be located on heated supporting table 198. A plate 199 is provided with openings 201 for properly orienting the food tray, this plate being particularly useful where the food compartments of the container are of different sizes. The upper heating elements 200 are supported on a transversely extending rod 202 carrying handles 204 which extend outwardly of the housing. Horizontally extending slots 206 communicate with vertical slots 208 whereby the elements 200 could be maintained in a raised position during insertion and removal of the food product. The heating elements 200 are conveniently designed with a configuration corresponding with the shape of the food containing compartments of the container 196. For example, if three triangular compartments are located in a container for receiving three food courses, the elements 200 can be shaped and positioned to conform with these pockets.

FIG. 17 illustrates an adaptation of the invention wherein the heated table 210 and the upper heating elements 212 are exposed rather than being confined within a housing. Since the food container 214 is the only structure of consequence in direct contact with the heating elements, the food container will still act as the primary heat sink thereby accomplishing an objective of the invention.

FIGS. 18 and 19 illustrate an arm structure 216 in association with the upper housing 218 of a cooking apparatus. This arm structure includes a handle 220 supported on transverse section 222 adapted to be held in a lower position by means of latch 224. The structure includes a pair of separate spring elements 226 each having one end pivotally connected at 228 to a side wall of housing 218. The opposite ends of these springs 226 are connected at the ends 230 of the arm 216, and these ends are pivotally connected at 232 to supporting base 234.

Downward movement of the handle 220 brings the arm and associated housing 218 downwardly toward the base 234. If a food container is located beneath the housing 218, and if the arm 216 latched, the spring means 226 will force the housing 218 downwardly relative to the food container. By providing appropriate heating elements within the food container, the spring structure described will provide the desired pressure engagement during a cooking operation.

FIGS. 20 to 23 illustrate a further modification of the invention wherein the housing portions are provided with removable heat transmitting structures. In FIGS. 20 and 21, the upper housing 236 includes an inner wall 238 having heating elements associated therewith in accordance with the foregoing disclosure. On the inner side of the wall 238, there is provided a removable plate 240 defining a plurality of protruding members 242. The plate 240 defines slots 244 on each side, and these slots are adapted to receive pins 246 so that the plate can be removably located on the wall 238. With this arrangement, a plate 240 can be designed to accommodate a container of a particular shape. For example, a protrusion 242 may be formed in the plate opposite each separate food compartment of a container.

In FIG. 22, a plate 248 is provided with three triangular shaped protruding sections. These sections are dimensioned in accordance with the shape of food compartments of a typical frozen food container. Arms 250 are provided for the plate 248 to permit removable attachment of the plate.

FIG. 23 illustrates a structure 252 having arms 254 for attachment of the structure to the lower housing. This structure defines ribs which are dimensioned to be received within grooves formed in the bottom wall of a typical frozen food container. These ribs function in the manner of thr protruding portions previously described so that heat from the heating elements can be rapidly transferred to the food container.

Various additional features can be incorporated in the construction to facilitate the cooking operation. For example, temperature sensing means such as probes attached to the wall 32 can be employed. The probes may penetrate the cover of the container 42 for detecting the temperature at the interior of the food product. A shut-off mechanism for the unit can be controlled by an adjustable dial so that the heating will terminate when a desired temperature is sensed by the probes.

Alternatively, a timer could be utilized so that the cooking will cease after the elapse of a pre-set time. The setting mechanism may include a setting applicable to a frozen container with a different setting being provided for a room temperature container so that a shorter heating time will be involved.

At the conclusion of a heating cycle as determined by temperature probes, a timer, or by other means, mechanisms may be employed for automatically separating the housings so that additional cooking will not take place. Otherwise, a visual or audible signal could be utilized to indicate the end of the cycle. In order to further control the cooking operation, thermostat mechanisms may be associated with the heating elements to maintain the elements at or below a maximum temperature throughout the heating cycle.

The described construction is characterized by significant flexibility in that food held in containers of conventional sizes can be conveniently cooked; however, the structure is also very useful in connection with the cooking of food in other containers including food which is simply wrapped in aluminum foil by the user of the apparatus. The mounting for the upper housing provides for good contact with structures of irregular shape since the upper housing will adjust to different shapes. The mounting structure described provides this feature even where relatively stiff material is utilized for forming the contacting wall of the upper housing.

In the case of conventional "TV" dinner containers, close contact is also provided in the lower housing, particularly where a housing is provided with a wall such as the wall 38 which is dimensioned to receive the container. The side walls of the container are positioned closely adjacent side wall portions of the wall 38 providing more effective heat transfer. The downwardly extending walls 30 of the upper housing also provide improved efficiency since these walls serve as a barrier against the loss of heat.

It will be understood that various changes and modifications may be made in the structures described which provide the characteristics of this invention without departing from the spirit thereof, particularly as defined in the following claims.

That which is claimed is:

1. A cooking apparatus for food comprising a support for the food, said support comprising upper and lower housings having facing inner walls for receiving said food therebetween, at least one of said walls comprising a thin-walled flexible member of low heat retaining capacity defining the cooking surface, said flexible member having its ends fixed relative to said housing, thin flexible heating means positioned against one side of the thin-walled flexible member, said thin-walled flexible member and said heating means comprising separate members subject to relative movement and thereby being subject to warpage relative to each other due to thermal stress, mounting means comprising means for maintaining said heating means in position against said thin-walled flexible member to achieve continued intimate association thereof, means for electrically insulating said heating means from said thin-walled flexible member, said maintaining means including resilient means located for engagement with said heating means at a plurality of spaced-apart points over substantially the entire extent of said heating means for thereby applying forces substantially completely over the extent of said heating means, and means thermally insulating said heating means from the portions of said support other than said thin-walled flexible member whereby the food serves as the primary heat sink for heat generated by said heating elements.

2. An apparatus in accordance with claim 1 wherein said food is held in a container.

3. An apparatus in accordance with claim 2 wherein at least one of said inner walls defines protruding portions adapted to be forced into contact with said container, and wherein said protruding portions are removably associated with said inner walls whereby different arrangements of protruding portions may be provided to substantially conform to various types of containers.

4. An apparatus in accordance with claim 2 wherein the food in said container is initially frozen, and including means associated with the housing for said one inner wall for applying pressure to said container whereby said protruding portions gradually penetrate inwardly as the food thaws.

5. A construction in accordance with claim 2 wherein at least one of said inner walls is flexible whereby said one inner wall conforms to irregularities in the container positioned in the apparatus.

6. An apparatus in accordance with claim 2 wherein the inner wall associated with said lower housing defines a container receiving recessed area, said recessed area being dimensioned to conform with the exterior dimensions of the container whereby bottom and side portions of the inner wall are located closely adjacent the corresponding walls of the container.

7. An apparatus in accordance with claim 2 including means connecting said upper and lower housings together, said connecting means including links for adjustably positioning said housings relative to each other.

8. An apparatus in accordance with claim 1 wherein said housing defines a substantial air space around said thin-walled flexible member to provide thermal insulation against the transfer of heat from the flexible member to the housings.

9. An apparatus in accordance with claim 1 wherein said heating means comprises a pair of thin electrical insulating sheets, and a third thin electrical insulating sheet carrying electrical resistance wires, said third sheet being sandwiched between said pair of sheets.

10. An apparatus in accordance with claim 1 wherein at least one of said inner walls defines protruding portions adapted to be forced into contact with said food.

11. An apparatus in accordance with claim 10 wherein the food is initially frozen, and including means associated with the housing for said one inner wall for applying pressure to said food whereby said protruding portions gradually penetrate inwardly as the food thaws.

12. An apparatus in accordance with claim 11 wherein the housing of said one wall is spring loaded relative to the other housing for applying said pressure to said food.

13. An apparatus in accordance with claim 1 including means connecting said upper and lower housings together, said connecting means including links for adjustably positioning said housings relative to each other.

14. An apparatus in accordance with claim 13 including a latch for closing said upper housing relative to said lower housing.

15. An apparatus in accordance with claim 14 including spring means, means for applying a load to said spring means when said upper and lower housings are held apart due to the presence of food in said apparatus, said spring means urging said upper housing downwardly toward said lower housing for thereby applying pressure to said food.

16. An apparatus in accordance with claim 13 wherein said upper housing defines downwardly extending side walls adapted to seat around the lower housing whereby the space between the housings receiving said food is substantially closed during use of the apparatus.

* * * * *